United States Patent

Jones

[11] 3,811,467
[45] May 21, 1974

[54] COW MILKING MACHINE SYSTEM, AND VACUUM REGULATOR INCORPORATED THEREIN

[76] Inventor: Leon Jones, 15081 Moran St., Los Alamitos, Calif. 92683

[22] Filed: Feb. 27, 1973

[21] Appl. No.: 336,186

[52] U.S. Cl............... 137/494, 119/14.44, 137/526
[51] Int. Cl........................ F16k 15/00, F16k 31/12
[58] Field of Search........... 137/550, 494, 506, 529, 137/535, 526, 102, 116.5; 119/14.44, 14.41, 14.51, 14.18, 14.43; 251/61.5, 251, 284, 294; 240/8.2; 141/35

[56] References Cited
UNITED STATES PATENTS

| | | | |
|---|---|---|---|
| 1,171,695 | 2/1916 | Brady................................ | 251/61.5 |
| 2,667,856 | 2/1954 | Heckendorf....................... | 137/506 |
| 2,670,758 | 3/1954 | Harstick et al. .................... | 137/526 |
| 3,125,111 | 3/1964 | Daly.................................. | 137/526 |

Primary Examiner—Henry T. Klinksiek
Assistant Examiner—Robert J. Miller
Attorney, Agent, or Firm—Richard L. Gausewitz

[57] ABSTRACT

A large vacuum pump is connected through a vacuum line to the cow milking apparatus, and a vacuum regulator is employed to admit into the line the amount of ambient air necessary to maintain the line pressure (and thus the pressure at the milking apparatus) constant within very narrow limits. The vacuum regulator comprises an air valve to control the admission of ambient air, and which is itself controlled by a light bias spring (having a low spring rate) and an opposed diaphragm. One side of the diaphragm is subjected to pressure generally equal to line pressure, whereas the other side of the diaphragm is subjected to pressure of air within a stabilizing and regulating dome. Adjustable means responsive to the pressure differential between the dome and ambient are provided to admit into the dome sufficient air to maintain the dome pressure constant. Furthermore, means are provided to bleed air through the diaphragm, thus maintaining substantially constant the pressure drop thereacross. The air valve is constructed with large radial ports which admit air radially over the thin edge of a slide valve, and in response to only a small valve movement. The very stable and controlled dome pressure, the substantially constant pressure drop across the diaphragm, the light bias spring, and the described air valve construction cooperate to result in extreme sensitivity and low-inertia operation and thus in very close regulation of line pressure.

39 Claims, 8 Drawing Figures

COW MILKING MACHINE SYSTEM, AND VACUUM REGULATOR INCORPORATED THEREIN

BACKGROUND OF THE INVENTION

1. Field of the Invention

This invention relates to the field of milking machine systems.

2. Description of Prior Art

The regulation of vacuum in cow milking machine systems is, at present, generally poor. Thus, for example, when air is drawn into the vacuum line through one or more sets of teat cups, the pressure increase (vacuum decrease) in the system may be so great that the teat cups fall from the udders of large numbers of cattle. Conversely, the pressure may at times be so low (vacuum so high) that the teats are injured. There exists a major need for a milking machine system capable of milking large numbers of cows, and wherein the pressure (vacuum) stays substantially constant, at all times, regardless of such factors as the drawing-in of air through the teat cups for one, or a number of, cows.

The vacuum regulators in prior-art milking systems were normally high-inertia devices which sensed the pressure at regions of high air velocity—which velocity created localized pressure changes and thus resulted in errors. Because of the high inertia, changes in line pressure could not be compensated for with sufficient rapidity. Prior-art regulators in milking systems were also characterized by the presence of air valves which were affected by air flow velocity and which could not pass volumes of air adequate to compensate rapidly for sudden changes in line pressure. Such regulators required major axial movement of the air valves, with consequent excessive changes in the forces exerted by the biasing springs. Furthermore, such biasing springs were often undesirably large and heavy. These, and other, factors resulted in the unsatisfactory pressure regulation outlined in the preceding paragraph.

There exist large numbers of vacuum regulators in arts not related to milking machine systems. Such regulators are, insofar as applicant is aware, unsatisfactory in the milking machine art. There are numerous reasons for this, including one or more of the following: (a) Such vacuum regulators are not adapted to handle the high-flow and dynamic conditions present in large milking systems. (b) Such regulators were of the "series" type, which would, if incorporated in a vacuum line to a milking machine, create major problems relative to cleaning of the regulator and relative to danger of damage to the vacuum pump. (c) Such regulators were of complex, and thus expensive, construction.

SUMMARY OF THE INVENTION:

In the present milking machine system, the pressure (and vacuum) regulator is not in series with the vacuum line, being instead adapted to admit the amount of ambient air necessary to maintain the desired line pressure. The regulator incorporates an air valve which is operated by a diaphragm and by an opposed light bias spring. To determine the set point of the system, one side of the diaphragm is exposed to the air within a dome. The dome is supplied with air from the ambient atmosphere, through a pressure-determining inlet valve which is adjustable to cause the dome pressure to remain constant at any desired level. Air from the dome is bled through the diaphragm, thus causing the pressure drop thereacross to be substantially constant. The other side of the diaphragm is exposed to a sensing chamber, into which the air is bled. Such chamber communicates selectively with a plurality of regions of the milking machine system, which regions are characterized by relatively low air velocity.

The air valve has a plurality of low-inertia wheels which move axially in conjoint manner, in sliding contact with the wall of the valve chamber. Such wall incorporates many large radial air ports which, when not blocked by the wheels, admit air from the ambient atmosphere. The ports associated with one wheel are offset relative to those associated with the other, so that simultaneous unblocking of both sets of ports is prevented. The wheel regions over which air flows when entering the ports have very thin radial dimensions, thus reducing to a minimum the effects of air velocity on valve operation.

The pressure-determining inlet valve to the dome is of an improved construction which maximizes control of pressure while improving shelf life.

DETAILED DESCRIPTION OF THE PREFERRED EMBODIMENT:

Throughout this specification and claims, to minimize confusion, reference is normally made to "pressure" instead of "vacuum," even though the "pressure" is less than atmospheric. Thus, the pressures referred to in the specification are absolute pressure as distinguished from gauge pressures, namely psia as distinguished from psig.

Figure 1:
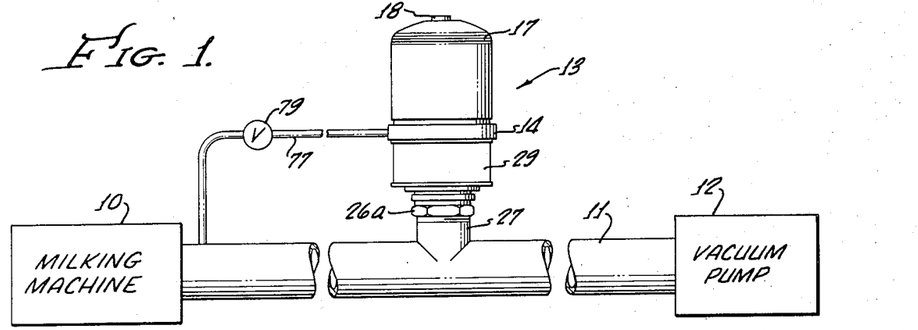
FIG. 1 is an elevational view of the present milking machine system, the milking machine and vacuum pump being shown schematically.

Referring first to FIG. 1, a cow milking machine system is illustrated to comprise a milking machine 10 which is connected by a vacuum line 11 to a vacuum pump 12. The milking machine may incorporate large numbers of teat cups as well as milk traps, valves, etc. The vacuum line 11 may be very long and may also incorporate valves, bends, etc. The vacuum pump 12 is often a high power high-volume pump which exhausts air from the line 11 to the atmosphere. A typical pump for a large system has on the order of 5–35 horsepower and is able to pass 100–300 cubic feet per minute of air. The milking machine system may be adapted to milk large numbers (for example, 30) of cows simultaneously.

Vacuum pump 12 is so operated that it will always attempt to draw on line 11 a greater vacuum than that which is desired to be present in the line. Therefore, to control the line pressure, ambient air is introduced into the line in the proper amount to cause the line pressure to be set at a fixed value which is regulated within narrow limits by the present invention. This value is, because of the introduction of ambient air, higher than that which the vacuum pump 12 is attempting to achieve. The ambient air is introduced by a pressure (and vacuum) regulator 13 which is described in detail below.

Figure 2:
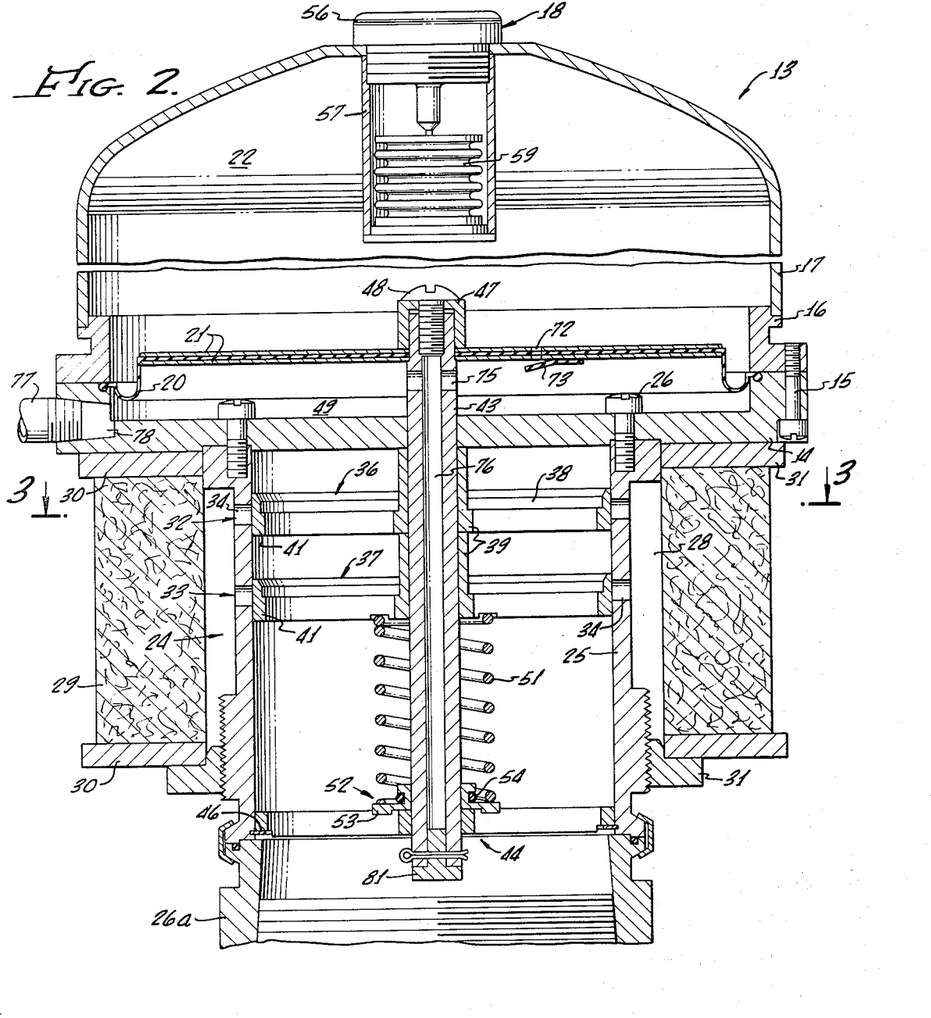
FIG. 2 is an enlarged vertical sectional view of the pressure-regulating portion of the milking machine system, portions of the dome being broken away.

Pressure regulator 13 comprises a cup-shaped body 14 over which is secured, by screws 15, a diaphragm-mounting ring 16. A large dome 17 is sealingly mounted on ring 16, as by welding, and has incorporated in the upper portion thereof an air-inlet and pressure-controlling valve 18. A diaphragm 20 is mounted across the lower end of the dome, having its edge portion sealingly mounted between mounting ring 16 and the rim of body 14.

The peripheral region of diaphragm 20 is not confined in any way except at the extreme edge, so that friction is minimized. The remaining regions of the diaphragm are confined between diaphragm plates 21 which comprise lightweight metal members. The dome 17, diaphragm 20 and ring 16 define a large "dome chamber" 22 which is highly important to the present pressure regulator.

An air valve 24 is mounted below body 14, and comprises a cylindrical body 25 having a diameter substantially less than that of body 14. The upper end of body 25 is secured by screws 26 to the body 14, whereas the lower end of body 25 is suitably and sealingly connected by coupling means 26a to a Tee 27 (FIG. 1) in vacuum line 11. If desired, a check valve (not shown) may be incorporated below air valve 24, for example in Tee 27, to insure against upward movement into the regulator 13 of water which is used for washing the milking machine and vacuum pump. Such check valve only permits downflow of air from the regulator 13 to the vacuum line, without permitting major amounts of reverse flow.

An annular groove or recess 28 is provided on the exterior of cylindrical body 25. Mounted around the body 25, and encompassing groove 26, is an annular air filter 29 having end rings 30. A mounting ring 31 is threadedly associated with body 25, beneath groove 28, and bears against the lower end ring 30 to thereby force the upper end ring against the underside of the cup-shaped body 14. Thus, all air which passes to the region of annular groove 28 is filtered.

Figures 3, 4, 5, 6, 7, 7A:
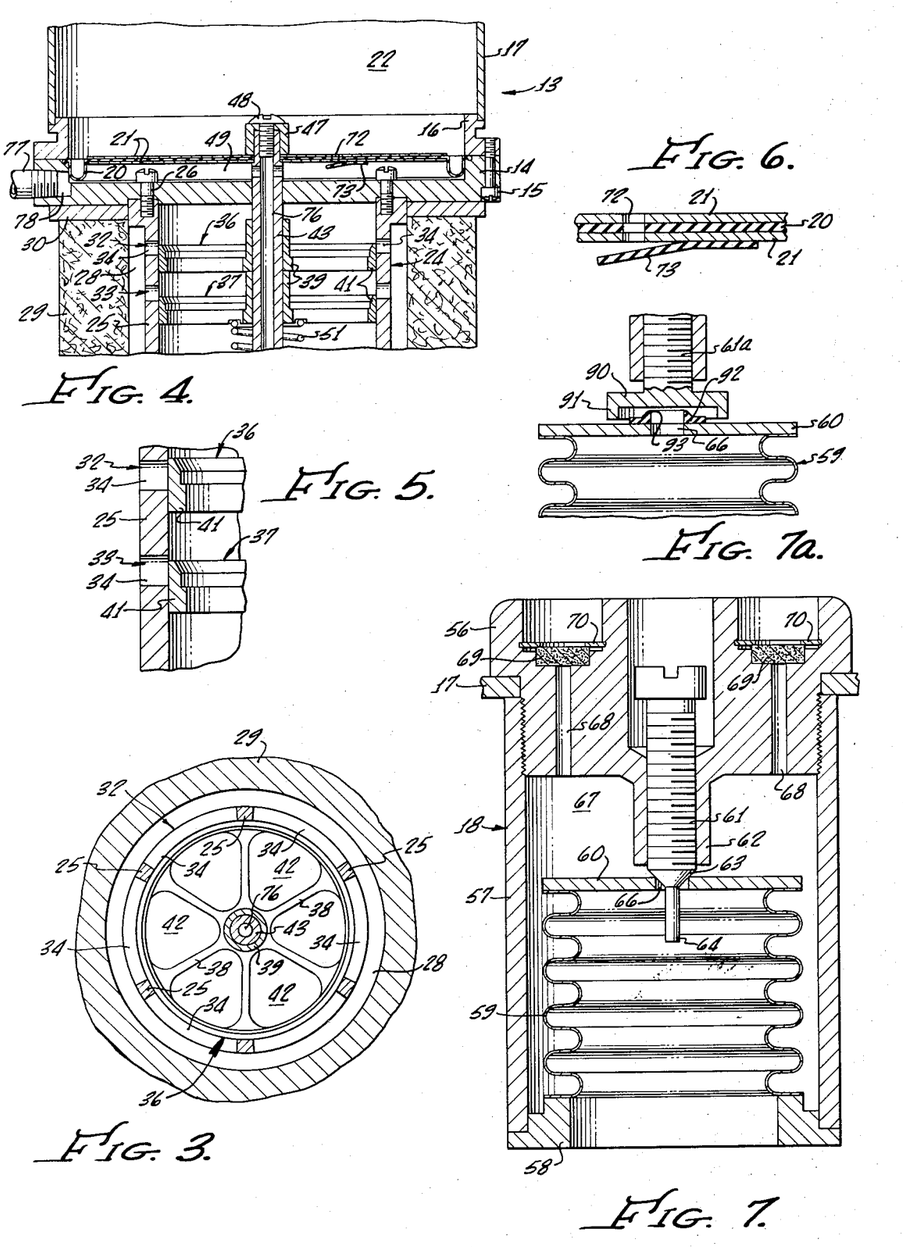
FIG. 3 is a horizontal sectional view taken on line 3—3 of FIG. 2.
FIG. 4 is a vertical sectional view corresponding to the central region of FIG. 2, but showing the air valve in an open position.
FIG. 5 is a greatly enlarged view showing one region of the showing of FIG. 4, the air valve being less open.
FIG. 6 is an enlarged view showing a check valve which bleeds air from the dome through the diaphragm to the sensing chamber.
FIGS. 7 and 7a are enlarged vertical sectional views showing two embodiments of the air-inlet and regulating valve to the dome.

Two rows 32 and 33 of radial air ports 34 are provided at longitudinally spaced regions along the valve body 25. Each port row 32 or 33 extends circumferentially of the body 25, and lies generally in a plane perpendicular to the axis of such body. As shown in FIG. 3, the radial ports 34 in each row are not circular but instead are circumferentially elongated slots having large cross-sectional flow areas.

First and second "wheels" 36 and 37 are mounted within body 25 and respectively adjacent the port rows 32 and 33, lying in spaced parallel planes which are perpendicular to the axis of valve body 25. The wheels are so designated because of their shapes; they do not rotate. Each is a relatively lightweight metal element having spokes 38 (FIG. 3), a hub 39 and an axially-elongated rim 41. The exterior surface of each rim 41 is cylindrical and is in sliding contact with the cylindrical interior surface of valve body 25. The spokes 38 define between them large-area air openings 42 (FIG. 3) through which air may flow into the vacuum line 11 after entering through radial ports 34.

The hubs 39 of the first and second wheels 36 and 37 are axially elongated and are fixedly secured, as by brazing or welding, to the exterior surface of an axial stem 43 which is mounted at the axis of valve body 25. One portion of stem 43 extends slidably through a central opening in the bottom wall of body 14. The lower end of the stem extends slidably through a wheel-shaped stem guide 44, the latter having a central hub, radial spokes and a peripheral rim which is locked by a snap ring 46 to body 25.

The upper end of stem 43 extends through central openings in diaphragm plates 21 and in diaphragm 20. A retaining cap 47 is mounted over the upper stem end, and seats on the upper diaphragm plate 21 so as to force the lower diaphragm plate against a shoulder on the stem. Thus, when a screw 48 is threaded downwardly through the cap and into the stem, the upper stem end is locked to the diaphragm assembly.

When the pressure in dome chamber 22 exceeds that in the chamber beneath the diaphragm assembly (which chamber is numbered 49 and may be termed the "sensing chamber"), the diaphragm assembly and the stem are forced downwardly and move the valve wheel rims 41 sufficiently far that air is admitted through ports 34. An axially-mounted helical compression spring 51 is supported at its lower end on stem guide 44 and is seated at its upper end on the under portion of the lower valve wheel 37. Thus, spring 51 is a biasing spring which opposes the diaphragm and tends to cause closing of the air valve.

Spring 51 is relatively light and has a low spring rate; therefore, the bias exerted by the spring does not change to a considerable extent in response to the relatively small axial shifting of the valve wheels 36 and 37. Spring 51 is somewhat preloaded, for example to about 14 pounds in a valve wherein the diameter of the diaphragm 20 is about 6 inches and the diameter of each valve wheel 36 and 37 is about 3½ inches.

Although it is very important that the operation of the present vacuum regulator be fast, the amount of friction should not be so low that there is excessive overtravel of the valve elements, with resultant possibility of instability. To prevent such operation, a damping means 52 is mounted around the lower end of stem 43. The damping means 52 comprises a Teflon ring 53 which is split at one point about its circumference, and has mounted therearound in an external groove therein a helical tension spring 54, the latter tending to squeeze the ring around the stem to thus introduce friction between the inner cylindrical surface of ring 53 and external cylindrical surface of the stem. The amount of such squeezing, and thus the amount of friction increase, is determined by the tension of the spring 54. The ring 53 is prevented from moving, since the lower portion thereof is seated on stem guide 44 and the upper portion thereof is held down by spring 51.

To additionally prevent valve instability, etc., the degree of registry of the upper valve wheel 36 with its associated row 32 of ports 34 is caused to be different from the degree of registry of the lower valve wheel 37 with its associated port row 33. Referring particularly to FIG. 5, it will be noted that the upper valve wheel 36 is still blocking its associated ports 34, at the same time that the lower valve wheel 37 has partially opened relative to its associated port row. Thus, all of the introduction of air is (when the valve is in the FIG. 5 position) through the lower port row 33. When further air introduction is required, the valve wheel assembly will move down an additional amount so that air will be admitted simultaneously through both rows 32 and 33 of ports 34, as shown in FIG. 4.

It will thus be seen that the present air valve assembly is capable of admitting large amounts of air in response to only small axial shifting of the wheels 36 and 37, which small axial shifting does not change substantially the bias force exerted by spring 51. However, the relationship is such that only the required amount of air is admitted, and tendencies toward instability are minimized. If desired, additional wheels and associated port rows may be provided above or below those shown in the drawings.

It is important to minimize the tendency of the inrushing air (through ports 34) to affect the positions of valve wheels 36 and 37, since such positions should be determined solely by the spring 51 and by the diaphragm assembly. Because the air flow through the ports 34 is radial, and because the air openings 42 are very large and the spokes 38 are small (FIG. 3), there are little or no direct pressure affects exerted by the air relative to the wheels 36 and 37. However, the air which passes radially-inwardly over the upper edges of rims 41 does tend to create low pressure regions and to "suck" the rims upwardly. To minimize this effect, the upper edge regions of the rims are beveled so that the extreme upper edges are very small in radial dimension. Because of such beveling, the upward (sucking) force exerted when the air flows radially inwardly through ports 34 is minimized.

It is also important that the movements of the diaphragm do not alter substantially the pressure present in dome chamber 22. Therefore, the dome is caused to be sufficiently large that the diaphragm movements will effect only a small percentage change in dome volume, and thus only a slight change in dome pressure. The number of cubic inches in dome chamber 22 should be at least several times the number of square inches in the area of the diaphragm. In the illustrated embodiment, this factor is about 6 (cubic inch dome volume about 6 times the square inch diaphragm area).

Proceeding next to a description of the air-inlet and pressure-controlling valve or regulator 18, this is best shown in FIG. 7, and comprises means to maintain substantially constant the air pressure in dome chamber 22. Furthermore, the constant pressure in chamber 22 is maintained a predetermined constant pressure differential below the pressure of the ambient atmosphere.

Valve 18 comprises a body 56 which is extended downwardly through an opening in dome 17, and is externally threaded at the lower portion thereof to receive an internally threaded conduit 57. At the lower end of conduit 57 is mounted a bellows-supporting ring 58 to which is sealed the lower end of a bellows 59 having a horizontal plate 60 at the upper end thereof. The bellows 59 acts as a spring to bias the plate 60 upwardly.

The extent of upward movement of bellows plate 60 is determined by an adjustable screw 61 which is threaded downwardly through a downwardly-protuberant central boss portion 62 of valve body 56. The lower end of screw 61 has a frustoconical surface 63 and a downwardly-extending cylindrical bellows guide portion 64 which extend into a central opening 66 in the bellows plate.

A chamber 67 is defined below valve body 56, within conduit 57 and above the bellows 59. The only way for air to enter such chamber 67 is through passages 68 in the valve body, the upper ends of such passages communicating through air filters 69 with the ambient atmosphere. The filters 69 are secured in place by suitable snap rings or other securing means, numbered 70.

When the set screw 61 is threaded upwardly to such position that the spring force exerted by bellows 59 is barely sufficient to seat plate 60 on surface 63, then the bellows will tend to open when the pressure in dome chamber 22 is only a small amount below atmospheric pressure. On the other hand, when set screw 61 is threaded downwardly to compress the bellows 59 to a considerable degree, then then the pressure in dome chamber 22 must reduce by a major amount (below that of the ambient atmosphere) before the plate 60 will be shifted off of seat 63 so that air may be introduced through opening 66 and into dome chamber 22.

The air in dome chamber 22 is not static, since there is a slow but substantially continuous flow therethrough from the ambient atmosphere through opening 66 to the chamber 22, and from the chamber 22 into the sensing chamber 49. The latter flow is through a small-diameter bleed port 72 (FIG. 6) in the diaphragm assembly 20–21. A flap valve 73 in the form of a rubber element having a very small bias is provided at the lower surface of the diaphragm assembly over the port 72, and serves to permit downward bleeding of air from chamber 22 to chamber 49 but to prevent substantial upward passage of air or water. The valve 73 performs the function of insuring that any wash water which is passed through the line 72 in order to clean the same of milk does not find its way upwardly into the dome 22.

After the air has bled through port 72 into the sensing chamber 49, it is passed through one of two alternately-employed sensing means. The first may be termed the "direct sensing means" and comprises ports 75 (FIG. 2) in stem 43 and which pass air from sensing chamber 49 to an axial passage 76 in the stem. The lower end of passage 76, when plug 81 is removed, communicates with the Tee 27 associated with line 11 (FIG. 1), so that the lower end of the passage 76 is responsive to the pressure in the Tee and thus in the line 11.

In some large systems the line 11 is long and may incorporate various valves, bends, etc., causing the pressure at the milking machine 10 to be substantially different from that at the regulator 13. In such systems, it is often desirable to employ a remote sensing means comprising a conduit 77 which communicates with a port 78 in body 14 and thus with the sensing chamber 49. The conduit 77 extends to any suitable point in line 11, for example to a region adjacent the milking machine 10 as shown in FIG. 1.

When direct sensing is desired, a valve 79 in conduit 77 (FIG. 1) is caused to be shut, and the axial passage 76 in stem 43 is open and communicates with the Tee 27. Conversely, when remote sensing is desired, valve 79 is opened and a plug 81 (FIG. 2) is mounted in the lower end of stem 43 and secured in position as by a cotter pin.

The port 72 through the diaphragm assembly is caused to be sufficiently large that it will not tend to become clogged by dust, etc., and to be sufficiently small that a pressure differential may exist between the pressure in dome chamber 22 and the pressure in sensing chamber 49. In the exemplary valve wherein the diameter of diaphragm assembly is about 6 inches and that of the valve wheels 36 and 37 about 3½ inches, the diameter of port 72 may be (for example) 0.040 inch.

The diameter of the central opening or port 66 in bellows plate 60 must be sufficiently large to satisfy air flow through port 72 in the diaphragm assembly. Thus, sufficient air may be admitted through port 66 to permit the diaphragm assembly to move upwardly and downwardly under the influence of the pressure in sensing chamber 49 (relative to that in the dome chamber) and under the influence of spring 51. In the present example, the diameter of port 66 may be 0.067 inch.

OPERATION

Let it be assumed that the system is connected as shown in FIG. 1, that the vacuum pump 12 is not in operation, and that everything is initially at atmospheric pressure (about 15 psia).

In the previously-stated example, wherein the preload of spring 51 is 14 pounds, and the diameter of diaphragm 20 is 6 inches, the area of the diaphragm is approximately 28 inches. Because of these relationships, a pressure differential across the diaphragm assembly of a little more than one-half psi causes the diaphragm to shift downwardly and initiate opening of the air valve.

As soon as vacuum pump 12 is started in operation, the reduced line pressure is transmitted through the operative one of sensing conduits 76 or 77 to the sensing chamber 49, and quickly causes the pressure differential across the diaphragm to be above one-half psi. The diaphragm is then sucked downwardly and effects partial opening of the air valve, so that air is drawn in through various ports 34 and through the Tee 27 into the vacuum line.

As the line pressure continues to decrease, the pressure in sensing chamber 49 decreases, and this decrease is reflected (due to flow through port 72) by a corresponding decrease in the pressure in dome chamber 22. Thus, for example, the pressure in the dome chamber always remains about one-half psi above the pressure in sensing chamber 49.

It follows that the pressures will decrease until the "set point" of Valve 18 (FIG. 7) is reached, which may (for example) occur when the dome pressure is 9 psia. Reaching of such set point causes the bellows plate 60 to move downwardly off seat 63 and thereby admit air into the dome through port 66. This initiates a "floating" operation of the bellows plate relative to seat 63, whereby sufficient air is admitted to cause the dome pressure to remain substantially constant at (for example) 9 psia.

Although the dome pressure is now 6 psi less than atmospheric, the pressure drop across the diaphaagm has remained substantially constant at (for example) one-half psi. Thus, the downward pressure exerted by the diaphragm on stem 43, and on the valve wheels 36 and 37, remains constant and balances the upward pressure exerted by bias spring 51. This balanced relationship results in the inflow of the proper amount of air through various ports 34 to cause the pressure in line 11 to remain substantially constant.

Let it be assumed, for example, that the line pressure reduces slightly from the desired substantially constant value. The reduction in line pressure is transmitted through the operative one of conduits 76-77 to sensing chamber 49, which decreases the pressure in chamber 49 and permits the diaphragm assembly to move downwardly and open valve wheels 36 and 37 to a greater extent relative to the associated ports 34. Additional air is therefore drawn in through ports 34 to the line, to compensate for the decrease in pressure.

Conversely, let it be assumed that the line pressure increases momentarily relative to the desired substantially constant value. The increase is transmitted through one of the conduits 76-77 to sensing chamber 49, and causes upward movement of the diaphragm (which upward movement is aided by the bias spring 51). The valve wheels 36-37 are then closed to an additional extent relative to their associated ports 34, thus reducing the inflow of air through the air valve means and causing a lowering of the line pressure.

As previously noted, if the change in line pressure is small, only the lower one (37) of the valve wheels is operated to open the associated ports 34 in the lower port row 33, since the upper wheel 36 remains in blocking relationship to its associated port row 32. However, a relatively extreme change in line pressure will cause both rows of ports to be at least partially unblocked, to thereby rapidly compensate for the pressure change.

It is pointed out that there is a large air flow through the line, and a large and rapid air flow through the ports in one or both rows 32-33. Furthermore, there is a substantially continuous flow of air through diaphragm port 72 and also through port 66 in the bellows plate. The air flow through the port 66 is modulated by vibratory upward and downward movement of the plate 60 which creates a modulating and regulating action to maintain the dome pressure constant within very close limits (such as, for example, 0.05 psi). This very constant dome pressure creates a substantially constant pressure in the line 11, despite various factors (such as drawing in of air through one or more sets of teat cups, and such as variations in the operation of the pump 12, etc.). With the described system, the line pressure may be maintained constant within about 0.1 psi, for example.

The constant line pressure is highly important in creating the correct amount of suction for milking purposes, and preventing injury to the teats of the cows' udders, and preventing dropping of the teat cups off all of the cows being milked despite large amounts of air inflow through sets of teat cups, etc.

It is to be noted that the degree of movement of stem 43 and of the valve wheels 36 and 37 is very small, for example, less than 0.050 inch per 100 cfm (cubic feet per minute) flow change, this being possible because of the large port area which can be uncovered in response to such small movement. It follows that the change in the spring rate of spring 51 is extremely small, which small change (when coupled with the constant pressure drop across the diaphragm assembly) causes very close regulation of the pressures. It also follows that the diaphragm movement is small, and this when coupled with the large dome volume assures a substantially constant dome pressure.

When it is desired to change the line pressure, it is merely necessary to turn the set screw 61 (FIG. 7). This is accomplished very easily. There is thus readily achieved a new set point in dome pressure, which results in a new set point in the line pressure.

EMBODIMENT OF FIG. 7a

The embodiment of FIG. 7a is identical to the embodiment previously described, except for the construction of the portion of pressure-regulating valve 18 which is adjacent bellows plate 60.

Referring to FIG. 7a, the lower end of adjustable screw 61a does not have the portions 63 and 64 of the previous embodiment, being instead provided with a radial flange 90 which has a depending peripheral skirt 91. A soft ring 92, formed of a soft elastomeric material, is bonded to the upper surface of bellows plate 60 in encompassing relationship to opening 66. The upper-central portion of the ring is caused to be protuberant in order to form a seat 93 for the lower (radial) surface of screw 61a.

The vertical dimension of skirt 91 is caused to be slightly less than the vertical dimension of ring 92 (including seat 93). Therefore, seat 93 engages the screw end prior to the time that the lower edge of the skirt is engaged by plate 60. When the skirt 91 is engaged by plate 60, for example when the system is not in operation, the skirt prevents excessive compression and setting of the elastomeric part 92–93. Thus, the shelf life of the present valve is improved.

The valve of FIG. 7a is believed to operate better than that of FIG. 7, particularly in locations where there is not much vibration. The valve of FIG. 7a achieves an extremely close and reliable regulation of dome air pressure.

The foregoing detailed description is to be clearly understood as given by way of illustration and example only, the spirit and scope of this invention being limited solely by the appended claims.

I claim:

1. A cow milking machine system, which comprises:

a. a vacuum pump,
   b. a milking machine,
   c. a vacuum line connecting said milking machine to said pump,
   d. air valve means to admit atmospheric air into said line,
   e. a diaphragm connected to said air valve means,
   f. spring means connected to said air valve means and biasing the same toward closed condition,
   g. means to define a dome chamber on one side of said diaphragm,
      said one side of said diaphragm being such that an increase in the air pressure in said dome chamber relative to the air pressure on the other side of said diaphragm causes said diaphragm to oppose said spring means and to open said air valve means, and a decrease in the air pressure in said dome chamber relative to the air pressure on said other side of said diaphragm causes said diaphragm to aid said spring means in closing said air valve means,
   h. means to admit atmospheric air into said dome chamber and to maintain the air pressure in said dome chamber at a predetermined constant value substantially below atmospheric pressure,
   i. means to bleed air from said dome chamber to said line, and
   j. means to subject said other side of said diaphragm to the air pressure of said line,
      whereby said air valve means is caused to admit into said line sufficient atmospheric air that the pressure in said line remains substantially constant.

2. The invention as claimed in claim 1, in which said means recited in clause (i) comprises means to maintain the air pressure on said other side of said diaphragm at a substantially constant differential below the air pressure in said dome chamber.

3. The invention as claimed in claim 1, in which said means recited in clause (i) comprises means to bleed air from said dome chamber to said other side of said diaphragm.

4. The invention as claimed in claim 3, in which said bleed means comprises a small opening in said diaphragm, and in which a check valve is provided to minimize flow of fluid through said small opening in a direction toward said dome chamber.

5. The invention as claimed in claim 1, in which means are provided to define a sensing chamber one wall of which is said other side of said diaphragm, and in which said means recited in clause (j) effects selective connection between said sensing chamber and the region of said line adjacent said air valve means, and between said sensing chamber and a region of said line remote from said air valve means.

6. The invention as claimed in claim 1, in which the volume of said dome chamber is large in comparison to the diameter of said diaphragm.

7. The invention as claimed in claim 1, in which said bias spring has a low spring rate, and in which said air valve means moves only a small distance in shifting between said one position and said opposite position.

8. The invention as claimed in claim 1, in which said means recited in clause (h) comprises a bellows one side of which is exposed to atmospheric pressure and the other side of which is exposed to the pressure in said dome chamber, the end wall of said bellows having an opening therein to admit atmospheric air into said dome chamber, and in which an adjustable element is mounted at said opening in such manner that the portion of said end wall encompassing said opening seats on said adjustable element.

9. The invention as claimed in claim 1, in which said air valve means comprises a cylindrical conduit connected to said line in Tee relationship, a valve wheel mounted coaxially in said conduit and having a cylindrical rim portion in axially slidable engagement with the interior cylindrical surface of said conduit, and a set of radial ports provided through the wall of said conduit, said ports being adapted to be blocked by said rim when said valve wheel is in one axial position in said conduit, and to be unblocked when said valve wheel is in another axial position in said conduit.

10. The invention as claimed in claim 9, in which the edge of said wheel rim, over which air passes in entering through said ports, has a small radial dimension, thereby minimizing the suction effect created by air flow through said ports.

11. The invention as claimed in claim 9, in which a second and corresponding valve wheel and an associated set of radial ports are provided in said air valve means, said second valve wheel having an axial position relative to its set of ports which is somewhat different from the axial position of said first-mentioned valve wheel relative to its set of ports.

12. The invention as claimed in claim 1, in which adjustable means are provided to create a predetermined amount of friction in said air valve means.

13. A pressure regulator for Tee connection to the line which extends between the vacuum pump and the milking machine of a cow milking machine system, said pressure regulator comprising:
  a. air valve means to admit atmospheric air into said line,
  b. a diaphragm connected to said air valve means,
  c. spring means connected to said air valve means and biasing the same toward closed condition,
  d. means to define a dome chamber on one side of said diaphragm,
   said one side of said diaphragm being such that an increase in the air pressure in said dome chamber relative to the air pressure on the other side of said diaphragm causes said diaphragm to oppose said spring means and to open said air valve means, and a decrease in the air pressure in said dome chamber relative to the air pressure on said other side of said diaphragm causes said diaphragm to aid said spring means in closing said air valve means,
  e. means to admit atmospheric air into said dome chamber and to maintain the air pressure in said dome chamber at a predetermined constant value substantially below atmospheric pressure,
  f. means to bleed air from said dome chamber to said line, and
  g. means to subject said other side of said diaphragm to the air pressure of said line,
   whereby said air valve means is caused to admit into said line sufficient atmospheric air that the pressure in said line remains substantially constant.

14. The invention as claimed in claim 13, in which said means recited in clause (f) comprises means to maintain the air pressure on said other side of said diaphragm at a substantially constant differential below the air pressure in said dome chamber.

15. The invention as claimed in claim 13, in which said means recited in clause (f) comprises means to bleed air from said dome chamber to said other side of said diaphragm.

16. The invention as claimed in claim 15, in which said bleed means comprises a small opening in said diaphragm, and in which a check valve is provided to minimize flow of fluid through said small opening in a direction toward said dome chamber.

17. The invention as claimed in claim 13, in which means are provided to define a sensing chamber one wall of which is said other side of said diaphragm, and in which said means recited in clause (g) effects selective connection between said sensing chamber and the region of said line adjacent said air valve means, and between said sensing chamber and a region of said line remote from said air valve means.

18. The invention as claimed in claim 13, in which the volume of said dome chamber is large in comparison to the diameter of said diaphragm.

19. The invention as claimed in claim 13, in which said bias spring has a low spring rate, and in which said air valve means moves only a small distance in shifting between said one position and said opposite position.

20. The invention as claimed in claim 1, in which said means recited in clause (e) comprises a bellows one side of which is exposed to atmospheric pressure and the other side of which is exposed to the pressure in said dome chamber, the end wall of said bellows having an opening therein to admit atmospheric air into said dome chamber, and in which an adjustable element is mounted at said opening in such manner that the portion of said end wall encompassing said opening seats on said adjustable element.

21. The invention as claimed in claim 13, in which said air valve means comprises a cylindrical conduit connected to said line in Tee relationship, a valve wheel mounted coaxially in said conduit and having a cylindrical rim portion in axially slidable engagement with the interior cylindrical surface of said conduit, and a set of radial ports provided through the wall of said conduit, said ports being adapted to be blocked by said rim when said valve wheel is in one axial position in said conduit, and to be unblocked when said valve wheel is in another axial position in said conduit.

22. The invention as claimed in claim 21, in which the edge of said wheel rim, over which air passes in entering through said ports, has a small radial dimension, thereby minimizing the suction effect created by air flow through said ports.

23. The invention as claimed in claim 21, in which a second and corresponding valve wheel and an associated set of radial ports are provided in said air valve means, said second valve wheel having an axial position relative to its set of ports which is somewhat different from the axial position of said first-mentioned valve wheel relative to its set of ports.

24. The invention as claimed in claim 13, in which adjustable means are provided to create a predetermined amount of friction in said air valve means.

25. A pressure regulator for Tee connection in the line which extends between the vacuum pump and the milking machine of a cow milking machine system, said pressure regulator comprising:
  a. a conduit connected to said line in Tee relationship,
  b. air valve means to admit atmospheric air into said conduit,
  c. spring means connected to said air valve means to urge the same toward closed position preventing admission of atmospheric air into said conduit,
  d. a diaphragm connected to said air valve means,
  e. wall means provided on the side of said diaphragm remote from said conduit,
   said wall means defining a dome chamber,
  f. means to admit atmospheric air into said dome chamber and to maintain the pressure in said dome chamber at a predetermined substantially constant level below that of the ambient atmosphere,
  g. means to effect communication between said line and the side of said diaphragm adjacent said conduit, and h. means to effect bleeding of air from said dome chamber to said adjacent side of said diaphragm and to maintain the air pressure on said adjacent side of said diaphragm at a predetermined substantially constant pressure differential below that in said dome chamber, whereby the pressure in said line is caused to be substantially constant at a level which is related to the pressure in said dome chamber.

26. The invention as claimed in claim 25, in which said spring means is a relatively lightweight spring having a low spring rate, in which said diaphragm is a large-area diaphragm, and in which said diaphragm and said spring substantially counterbalance each other when there is only a relatively small pressure drop across said diaphragm.

27. The invention as claimed in claim 25, in which said pressure regulator is combined with a milking machine, with a vacuum pump, and with a line connecting said milking machine to said vacuum pump, said line being connected to said conduit and thus to said air valve.

28. The invention as claimed in claim 25, in which said means recited in clause (f) comprises a bellows having a bellows plate at one end thereof, said bellows plate having an opening therein, one side of said bellows communicating with the ambient atmosphere, the other side of said bellows communicating with said dome chamber, said opening in said bellows plate introducing air from the ambient atmosphere into said dome chamber, and in which the spring force of said bellows tends to seat said plate on an adjustable screw having a tapered seat portion which partially penetrates said opening in said bellows plate.

29. The invention as claimed in claim 25, in which said conduit has a circumferential row of radial air ports therethrough, and in which said air valve means comprises a lightweight valve wheel the rim of which has a cylindrical exterior surface in sliding contact with the interior cylindrical wall of said conduit adjacent said air ports.

30. The invention as claimed in claim 29, in which the edge of said rim over which air passes when entering said ports has a small radial dimension.

31. The invention as claimed in claim 1, in which said means recited in clause (h) comprises a flexible resilient element one side of which is exposed to atmospheric pressure and the other side of which is exposed to the pressure in said dome chamber, a portion of said element having an opening therein to admit atmospheric air into said dome chamber, in which an adjustable element is mounted opposite said opening, and in which a soft annular seat is provided coaxially of said opening and interposed between said adjustable element and said portion, said seat preventing air flow through said opening when said portion is near said adjustable element, said seat permitting air flow through said opening when said portion is relatively remote from said adjustable element.

32. The invention as claimed in claim 31, in which said seat is sealingly secured to said portion of said flexible resilient element.

33. The invention as claimed in claim 31, in which said flexible resilient element is a bellows.

34. The invention as claimed in claim 31, in which stop means are provided to determine the maximum degree of compression of said soft seat.

35. The invention as claimed in claim 13, in which said means recited in clause (e) comprises a flexible resilient element one side of which is exposed to atmospheric pressure and the other side of which is exposed to the pressure in said dome chamber, a portion of said element having an opening therein to admit atmospheric air into said dome chamber, in which an adjustable element is mounted opposite said opening, and in which a soft annular seat is provided coaxially of said opening and interposed between said adjustable element and said portion, said seat preventing air flow through said opening when said portion is near said adjustable element, said seat permitting air flow through said opening when said portion is relatively remote from said adjustable element.

36. The invention as claimed in claim 35, in which said seat is sealingly secured to said portion of said flexible resilient element.

37. The invention as claimed in claim 35, in which said flexible resilient element is a bellows.

38. The invention as claimed in claim 35, in which stop means are provided to determine the maximum degree of compression of said soft seat.

39. The invention as claimed in claim 38, in which said adjustable element is a screw having a flange at the end thereof, and in which said stop means is a skirt on said flange and adapted to be engaged by said portion of said flexible resilient element.

* * * * *

UNITED STATES PATENT OFFICE
CERTIFICATE OF CORRECTION

Patent No. 3,811,467  Dated May 21, 1974

Inventor(s) Leon Jones

It is certified that error appears in the above-identified patent and that said Letters Patent are hereby corrected as shown below:

Cancel Claims 13-19, 21-26, 28-30 and 35-39.

Signed and sealed this 29th day of October 1974.

(SEAL)
Attest:

McCOY M. GIBSON JR.
Attesting Officer

C. MARSHALL DANN
Commissioner of Patents